United States Patent [19]

Torossian et al.

[11] Patent Number: 4,621,212

[45] Date of Patent: Nov. 4, 1986

[54] STATOR CONDUCTOR INSULATOR

[75] Inventors: Kevork A. Torossian, Schenectady; Ralph T. Heisler, Scotia; Frederick E. Cox, Gloversville, all of N.Y.

[73] Assignee: General Electric Company, Schenectady, N.Y.

[21] Appl. No.: 595,596

[22] Filed: Apr. 2, 1984

[51] Int. Cl.$^4$ ............................................. H02K 3/46
[52] U.S. Cl. ..................................... 310/260; 310/43; 310/45; 310/54; 310/179; 310/201
[58] Field of Search .................. 310/179, 201, 45, 43, 310/54, 59, 71, 260, 60 R, 60 A, 58, 254, 259, 270; 264/272.19; 249/95

[56] References Cited

U.S. PATENT DOCUMENTS

| | | | |
|---|---|---|---|
| 3,075,112 | 1/1963 | Andersen | 30/260 |
| 3,075,250 | 1/1963 | Strohm et al. | 310/43 |
| 3,653,959 | 4/1972 | Kehr | 264/272.19 |
| 3,979,822 | 9/1976 | Halm | 310/260 |
| 4,151,434 | 4/1979 | Zona et al. | 310/43 |
| 4,330,727 | 5/1982 | Oudet | 310/43 |
| 4,405,553 | 9/1983 | Lövgren | 264/272.19 |

FOREIGN PATENT DOCUMENTS 0057606  5/1979  Japan ............................... 310/43

Primary Examiner—R. Skudy
Attorney, Agent, or Firm—Paul Checkovich; Jerome C. Squillaro

[57] ABSTRACT

Series loops of the stator of a large steam turbine-generator are electrically insulated from each other by enclosing each of them in its own clamshell thermoplastic resin mold and filling the mold with an electrically-insulating thermosetting resin material which bonds to the metal of the series loops and the stator bars and bonds also to the ground insulation covering on the stator bars and to the mold and together with the mold provides in cured form an integral body which is resistant to vibrational and impact forces and to distortional forces incident to thermal cycling of the equipment in normal use.

5 Claims, 5 Drawing Figures

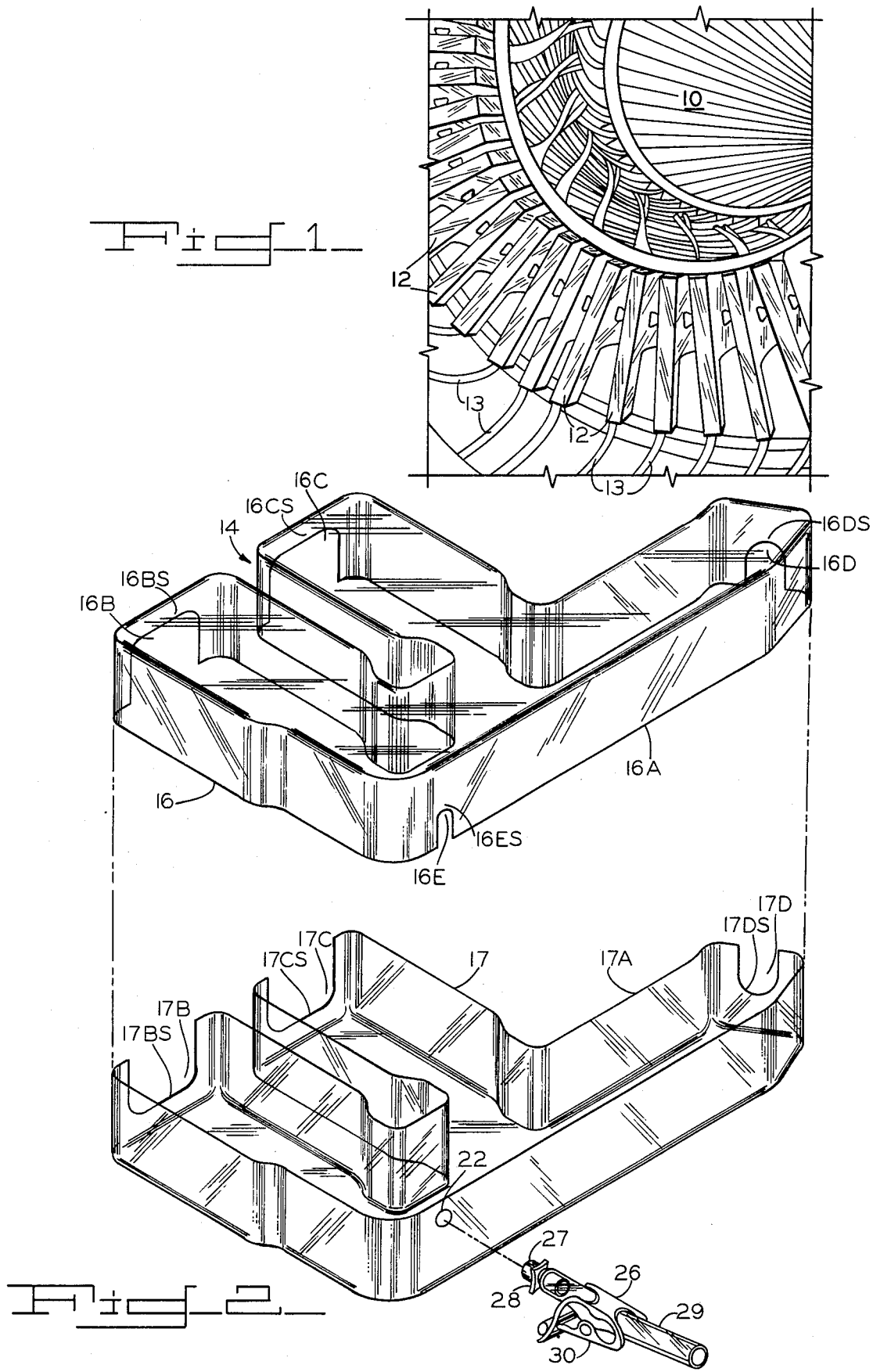

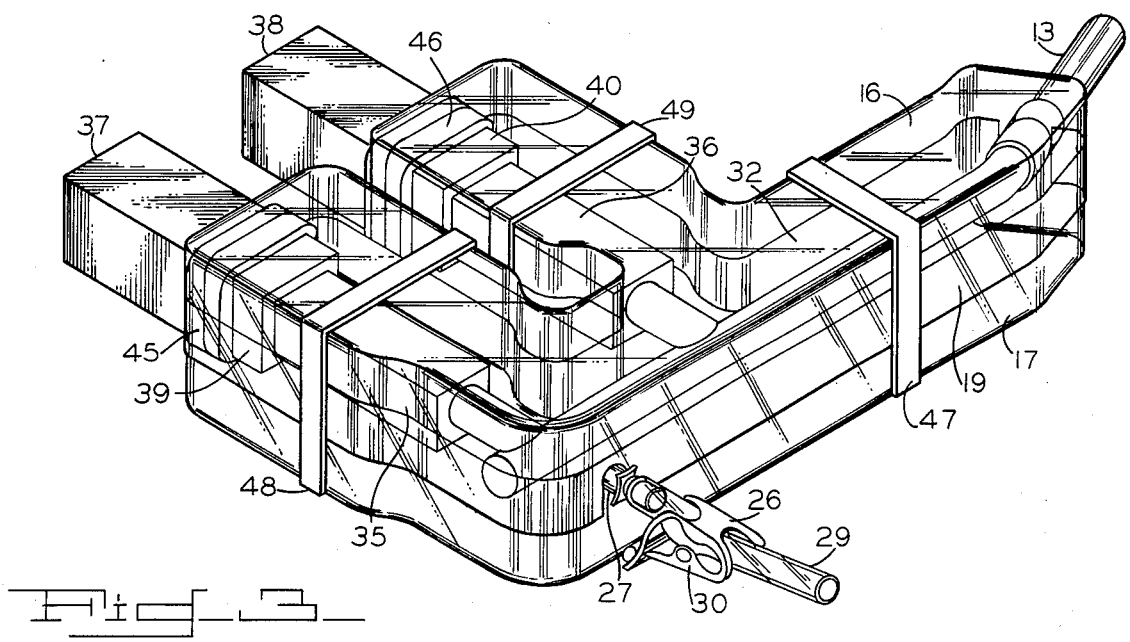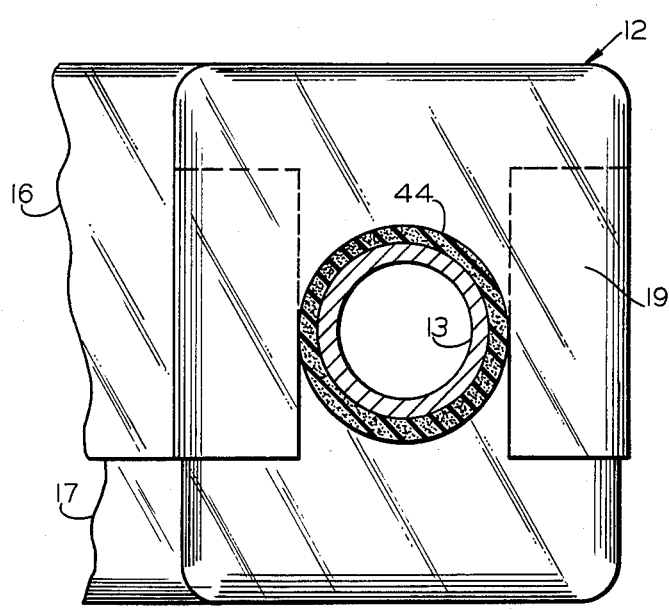

STATOR CONDUCTOR INSULATOR

FIELD OF THE INVENTION

The present invention relates generally to the electrical insulating art, and is more particularly concerned with a novel method of insulating generator series loops and similar metal bodies, with the resulting integral mold insulating structures, and with an unique clamshell mold having special utility in the production of those structures by that method.

CROSS REFERENCES

The present invention is related to that of copending patent application Ser. No. 595,599 filed of even date herewith in the names of Torossian, Markovitz and Cox and assigned to the assignee hereof which discloses and claims novel epoxy resin compositions having special utility in the production of composite molded bodies of electrical insulation, and with new composite molded bodies of thermoplastic resin shells filled with and bonded to those novel compositions.

BACKGROUND OF THE INVENTION

Conductor insulation technology has evolved throughout the electrical age in response to ever-changing and increasing demands and requirements. Thus, many new compositions, processes, and structures have been devised and the art has reached an advanced state of development. There are, nevertheless, some significant persisting problems, one of which concerns the insulation of series loops at the ends of the stators of large, fluid-cooled, electric generators. At present, and for a very long time, these elements have been insulated and thereby electrically isolated from each other by manual taping and patching procedures. The difficulty of this in-place method, however, has increased with the evolving of liquid-cooled generator designs and the diminishing space between loops. The improvement of this invention increases insulation resistance to hi-pot (i.e., high electric potential) failures during the various manufacturing phases of production of these machines and eliminates costly shipping delays and repairing procedures. Independently of such possible failures, however, this invention minimizes significant penalties in the form of labor cost resulting from poor accessibility of parts which must be securely and assuredly insulated in the initial installation.

General recognition of this problem by those skilled in the art has resulted in a variety of attempts at solutions along tapeless practice lines. The well-known liquid system methods of potting and casting have been proposed and attempted without satisfactory results, particularly as applied to the commercial production of large generating apparatus. Major shortcomings of those approaches include the necessity for designing the potting compound with "self leveling" characteristics, frequent mixing equipment breakdowns, uncontrollable resin fill leaks, expensive potting cases, and general incompatability with established manufacturing practices.

SUMMARY OF THE INVENTION

By virtue of our present invention, predicated on our discoveries and novel concepts detailed below, this series loop insulating problem has been solved. In addition, we have provided by this invention, a new and improved way in which to provide fully effective electrical insulation in other applications involving similar difficulties and requirements. Moreover, this result has been gained without incurring any offsetting cost penalty or other significant detrimental result or effect upon either the manufacturing operation or the finished generator product.

One of our new concepts is to provide a mold in the form of a shell which will become an integral part of the insulation covering the part of the conductor, series loop or other metal body contained within the shell. A related new idea of ours is to avoid the settling problem and thus eliminate the need for mixing the insulating fill material shortly before introducing it into the mold by using much higher viscosity fill material than previously possible and employing static rather than dynamic mixing means. Thus, we have effectively eliminated the long-standing fill leakage problem and have also eliminated gravity as an essential feature of the mold filling operation. Our new practice involves, then, the use of appreciable pressure to inject or introduce the fill into the mold and affords the choice between premixing and storing (frozen or unfrozen) and mixing on site for immediate use. It additionally eliminates the necessity for a sprue to serve the air-venting purpose during filling operation because the fill under substantial pressure expels the air within the mold through elastomeric sponge ring packing around the conductor or its supporting or associated structure where it enters the mold and is sealed thereto non-hermetically but effectively to contain the injected fill material.

In providing this new integral or composite molded insulating body, we discovered unexpectedly that it is possible to avoid deformation of the plastic mold during charging and curing of the plastic fill material. In particular, we found that molds of certain thermoplastic materials including bisphenol-A polycarbonates such as General Electric Company's Lexan ® resin, polyester material such as that made from 1,4-butanediol and terephthalic acid such as General Electric Company's Valox ® resin, Celanes Company's Celanex TM resin or Eastman Kodak's Kodapak TM resin, or General Electric Company's Ultemp TM polyetherimide resin, or the various commercially-available polysulfone resins are capable of maintaining shape while accommodating dimensional changes incident to such use, even when formed with the relatively thin wall sections well-suited to the purposes of this invention.

As a related discovery, we found that these thermoplastic mold materials can be provided of adequate strength for our purposes in wall thicknesses from about one-sixteenth inch to one-quarter inch, and wall thickness in a single mold piece or section may vary up to 50% without detrimental effect. Further, conventional vacuum-forming technique serves quite well as a method of producing the molds and mold components of this invention.

In accordance with another concept and related discoveries, these molds are in the form clamshells which are two half shells assembled with their edges interfittingly overlapped, the extent of overlapping being adjustable to accommodate variations in the dimensions of conductors to be covered and insulated by the ultimate composite molded insulating bodies. Generally, an inch or two of overlap is designed into this structure and the assembled clamshell is held together during the filling operation, suitably by means of straps. In addition, the overlapped edge portions may be secured by adhesive means between them, which preferably also serves to seal the edges against leakage of uncured fill material between the molds under the substantial pressure applied in injecting that material in fluent-preferably relatively viscous liquid-form into the mold.

Another discovery of ours is that it is not necessary to close the ends of the mold tightly. In fact, it is desirable to secure the conductor or its support at those points only to the extent that the plastic fill material is not forced by the injecting pressure through the space between the mold and the conductor or support. As applied to a series loop of a generator stator, the ends of the mold are those locations where the series loop and the associated stator bars enter or extend into the mold, as described more fully below. As indicated above, a particularly desirable way in which this can be accomplished with assurance that the expulsion of air from the mold during the filling operation will not be prevented is to use an elastomeric sponge material, packing it in place securely, but not gas-tightly, between the mold and the series loop and the stator bars at mold entry location.

Still another novel feature of this invention attributable to our new concepts and discoveries, is the fact that the mold can be assembled readily in two parts around the conductor segment to be insulated, the location and spacing of the mold relative to the series loop, stator bar or other conductor being guided and controlled by contact points designed into the mold shell. As described in detail below, those contact points are the sills of the slots formed in the edge portions of the extremities of the half shells which sills, by virtue of their locations, fix the positions and spacings of the series loop or other conductor within the mold.

Still another of our concepts is to provide a dual-purpose sprue as a separate component including a tube to extend through an aperture in one half shell and a registered slot in an edge portion of the other half shell to limit telescoping of the half shells in assembling the mold. This novel combination sprue and half shell-locating or positioning means is equipped with closure means which is removable by cutting the sprue tube off at or close to the mold surface when the mold is filled and the thermosetting fill material has cured sufficiently.

A further new concept of this invention is to provide an insulating assembly comprising a polycarbonate or equivalent thermoplastic resin mold structure or shell surrounding and enclosing or enveloping the portion or segment of a conductor to be insulated and filled with thermosetting insulating material, this integral composite structure being readily removable by heating the cured or thermoset fill material so that it can be stripped from the conductor.

In its method aspect, this invention, briefly described, comprises the steps of enclosing a segment of an elongated metal body to be electrically insulated in a mold of a first plastic material and then injecting a second plastic material of viscosity greater than 100,000 centipoises (cps) at 25° C. into the mold under pressure, thereby displacing the air from the mold cavity or chamber and filling the mold with the second plastic material, and thereafter curing the second plastic material in situ in contact with both the mold and the metal body within the mold and thereby bonding the second plastic material to the first plastic material to produce a composite molded insulating body. The mold in this enclosed in the mold by bringing the edges of parts together in interfitting overlapped relation. Further, the mold is a shell of thermoplastic resin and the overlapped edges of the two or more mold parts are secured or sealed against leakage between them of the mold-filling second resin. As will be described in greater detail below, the plastic mold shell is of high-performance thermoplastic resin and the plastic fill material is a thermosetting resin compatible with the metal of the segment to be insulated and with the plastic of the mold shell and as indicated above, is bondable on curing both to the metal of the segment being insulated and to the mold.

This invention in article-of-manufacture terms, briefly described, comprises a clamshell mold of shape-maintaining, crack-resistant, sheet material for enclosure of a segment of a metal body to be electrically insulated. The mold provides a fill chamber and has apertures of reduced cross-sectional dimension to receive parts of a metal body extending into the mold. The mold itself comprises two opposed half shells interfitted with edges overlapped over the greater portions of their lengths. Further, the half shells are fitted or secured together by adhesive material between the overlapped edge portions so that fill material will not leak out between them and, again, the half shells are of high-performance thermoplastic material, as further described below.

In its apparatus aspect, the present invention, generally and broadly described, comprises a molded body of insulating material covering each series loop of the stator of large steam turbine generator with the usual plurality of series loops, each molded body comprising a clamshell mold of a first plastic material disposed around a loop, and a cured second plastic material filling the mold and bonded to both the mold and the loop portion within the mold. Again, the thermoplastic shell is shape-maintaining and of high-performance plastic material and the two half shells comprising the mold are fitted together with their edges overlapped along the sides of the mold.

BRIEF DESCRIPTION OF THE DRAWINGS

Those skilled in the art will gain a further and better understanding of the present invention upon consideration of the detailed description of the preferred embodiment of the invention set forth below and illustrated in the drawings accompanying and forming part of this specification, in which:

FIG. 1 is a fragmentary, perspective view of a large steam turbine generator stator of the one-pass cooling arrangement type with insulated connections or series loops provided in accordance with this invention;

FIG. 2 is an exploded perspective view of a clamshell mold of the kind employed in producing the insulated structure of FIG. 1, showing the two half shells of the mold positioned for assembly on a series loop, and showing the dual-purpose sprue subassembly poised for insertion into the lower half shell;

FIG. 3 is a perspective view of the assembled clamshell mold of this invention of FIGS. 1 and 2 with sprue in place and the interfitted overlapping edges of the two half shells bonded together and straps around the half shells holding them together with the series loop and stator bar end portions to be insulated disposed within the shell;

FIG. 4 is an enlarged, fragmentary view of an extremity of clamshell of FIGS. 1–3 non-hermetically a ring of elastomeric sponge material in each instance; and, FIG. 5 is a side-elevational view, partly in section, of the mold of FIGS. 1–4, showing the fill bonded to the series loop and the stator bars, and to the stator bar insulation and the mold, and indicating removal of most of the sprue sub-assembly by cutting flush with the surface of the mold.

DETAILED DESCRIPTION OF PREFERRED EMBODIMENTS

Figure 5:
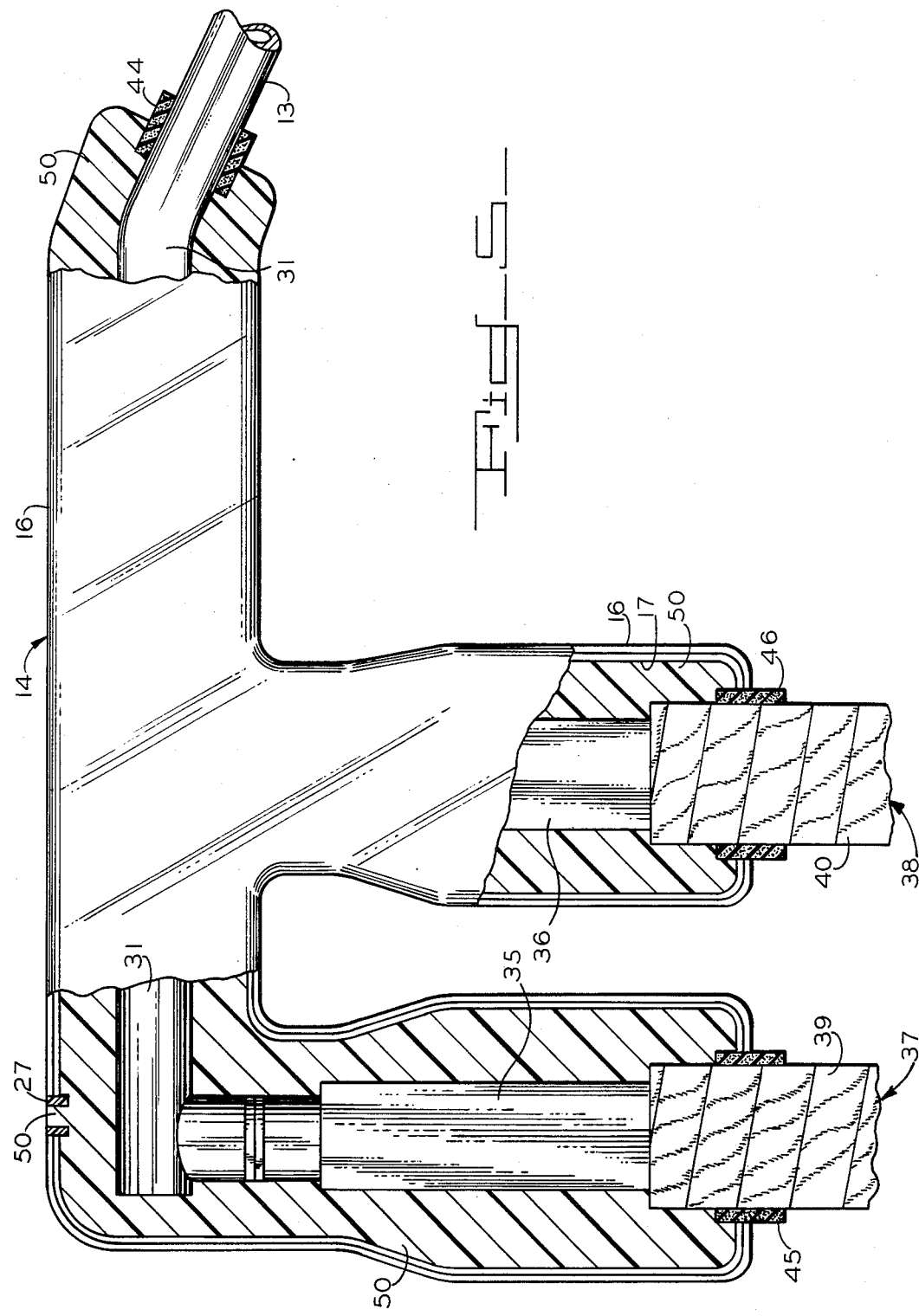

The present invention has special utility in application to large steam turbine-driven generators in which the liquid-cooled series loops of the stator are provided with molded insulation, as illustrated in FIG. 1. Thus, the series loops at the end of stator 10 are each shown in this fragmentary view to be encased in a separate plastic molded body 12 and thereby electrically insulated and isolated from each other. Liquid coolant lines 13 individually serving the series loops and themselves provided with insulation are shown in assembly with their respective molded bodies 12. The method of this invention employed in producing molded bodies 12 and the novel component parts and materials of those bodies are described in detail below.

Clamshell mold 14 of this invention, as illustrated in FIG. 2, consists of two opposed half shells 16 and 17 which are shaped and sized to fit together with edge portions 16A and 17A overlapped, as shown at 19 in FIG. 3, to provide a fill chamber or cavity. Shells 16 and 17 are also formed with notch portions 16B, 16C, 16D and 17B, 17C and 17D at their three extremities so that in assembled relation they provide apertures to receive series loop elements. As shown in FIG. 2, sills 16BS, 16CS, 16DS, 17BS, 17CS and 17DS of the respective notch portions are all displaced from the top or bottom of mold 14 to provide at least one-quarter inch space between the mold inner surface and the series loop stator bar end or other conductor segment to be insulated in the mold. Additionally, a smaller aperture 22 is formed in side wall 17A of half shell 17 to receive an end portion of the tube or sprue sub-assembly 26, overlapping edge 16A of half shell 16 being notched at 16E for registry with aperture 22. Again, sill 16ES of this notch is spaced from the top surface of half shell 16 to limit the extent of telescoping of the half shells together, as subsequently described herein.

Sprue sub-assembly 26, as shown in FIGS. 2 and 3, includes a nipple 27 extending through aperture 22 and notch 16E and carrying a washer 28 disposed between overlapping edge portions 16A and 17A, and a fill tube 29 fitted on nipple 27. A spring clamp 30 preferably of plastic material but suitably of metal, is carried by fill tube 29, serving as a valve to prevent uncured fill material from flowing out of the mold fill chamber through the sprue sub-assembly.

With nipple 27 in place the two half shells are brought together around a series loop-stator bar assembly to be insulated, the half shells being telescoped with edge portions interfitted and sill 16ES bearing against nipple 27 of the sprue sub-assembly.

With mold body 14 thus assembled on a series loop 31 including coolant line 13, as shown in FIGS. 3 and 5, parts of the loop not covered by wrapped insulation are disposed within and extend substantially coaxially through branched fill chamber 32 defined by the inner surfaces of assembled half shells 16 and 17. Ends 35 and 36 of stator bars 37 and 38, respectively, partially wrapped with ground insulation shown at 39 and 40 are likewise disposed in chamber 32.

In the illustrated preferred embodiment, the parts of series loop 31 and stator bars 37 and 38 in the apertures at the extremities of mold body 12 are non-hermetically sealed to mold 14 by means of rings 44, 45 and 46 of sponge elastomeric material, suitably rubber, as shown to best advantage FIGS. 4 and 5. Half shells 16 and 17 are also secured together so that fill material introduced under pressure into the mold chamber does not escape between their overlapped edge portions. In preferred practice of this invention a sealing compound, suitably the same as the insulating fill material, is provided between the half shells and cured to bond them together over the full length of their overlapped portions. The clamshell mold is held together in place with the series loop and stator ends inside by means of three straps 47, 48 and 49, suitably of thermoplastic material such as a polyamide resin.

As thus assembled, mold 14 is ready to receive insulating material fill. This step is carried out by injecting suitable insulating material into the mold body through tube 29 and nipple 27 of the sprue subassembly and thereby displacing air from the mold fill chamber through rings 44, 45 and 46. The pressure applied to the flowable insulating fill material will preferably be of the order of 20 to 80 pounds per square inch gauge (psig).

As indicated above, the materials employed in accordance with this invention are of special preference or even necessity in some instances, so far as consistently obtaining the desirable new results and advantages of this invention is concerned. Thus, in accordance with our preference, half shells 16 and 17 are of the same material although this is not essential in accordance with our findings. Preferably also, the material of clamshell mold body 14 is transparent polycarbonate resin and half shells 16 and 17 are formed by vacuum molding technique to uniform wall thickness between about $\frac{1}{8}$ inch and $\frac{1}{4}$ inch. Otherwise suitable opaque materials lack the convenience feature of visual observation of progress of the mold-filling step, but when used to produce half shells 16 and 17 as described above afford the other advantages of polycarbonate transparent resin including capability of providing a clamshell mold body which will accommodate some dimensional variations in series loops and other conductors to be encased in composite molded insulation, and the ability to withstand internal pressures up to 100 pounds per square inch without deformation of the mold fill chamber-defining structure. This shape-maintaining characteristic of the half shells and clamshell molds of this invention thus is a novel feature of design which applies equally to all the thermoplastic resins listed above, enabling avoidance of the necessity for use of heavier section, rigid mold structures which tend to fracture and break on thermal cycling in normal use.

The fill material is a thermosetting resin, as distinct from the thermoplastic resin of the mold half shells, and it is compatible with the metal of the coolant line, the bar ground insulation, the series loop to be insulated and the half shell thermoplastic material. In fact, on curing the fill material thermosetting plastic should bond securely both to the metallic bodies to be insulated and to the mold body, and preferably it will also bond well to the wrapped insulation on stator bars. For this purpose, we prefer to use one of those novel compositions set forth and claimed in the above-referenced copending patent application, Ser. No. 595,599, the portions of the disclosure of which relating thereto are hereby incorporated herein by reference.

Further, the thermosetting resin fill material is a nonselfleveling fluent material, i.e., a very thick liquid, as it is injected into the mold. Thus it will have viscosity greater than 100,000 cps and even as high as 300,000 cps or higher when it is injected into the mold at about room temperature. When, as now preferred, this fill material is one of those novel compositions of referenced patent application Ser. No. 595,599, it will have such high viscosity as a result of the incorporation of fillers in the relatively low viscosity epoxy resin-polyglycol diepoxide basic mixture, as described in that patent application.

After the filling operation is completed and the fill 50 has cured and solidified in place on the mold body, sprue tube 29 is cut off between clamp 30 and mold body 12. Preferably, as shown in FIG. 5, the end is made flush with the surface of body 12.

If after the composite molded insulating body shown in FIG. 5 has been in use for some time, it is desirable to remove it from the series loop and coolant line, this may readily be accomplished by heating the molded body to bring the thermoplastic fill material to the point that it can be readily stripped from those parts. When the mold shell is of Lexan ® polycarbonate resin, as we prefer, it can be stripped away by heating to about 150° C. Then, by raising the temperature of the cured fill material an additional 20 or 30 degrees, that insulation will be easily removable from the metal surfaces it covers.

It will be understood by those skilled in the art that the series loop assembly of FIG. 1 can be produced much more readily and rapidly than manual wrapping of insulation can be accomplished, the foregoing installation operation simply being repeated for each separate series loop of a stator. Through the use of this invention, moreover, uniform insulation is assured for every series loop with consequent protection against insulation breakdown or development of electrical shorting tendency during protracted periods of generator operation. An additional advantage, as indicated above, is that the close spacing of the modern design series loop structures does not constitute a problem in use of the present invention. This stands in sharp contrast to the manual technique that faces a task of increasing difficulty to provide assuredly adequate insulation for large electric generators.

Those skilled in the art will gain a further and better understanding of this invention and the important advantages which it affords over the prior art from the following illustrative, but not limiting, examples which detail accounts of actual practice of the invention.

EXAMPLE I

A clamshell mold body substantially as shown and described above was provided by vacuum thermoforming polycarbonate resin (commercially available thermoplastic composition marketed by General Electric Company under the trademark Lexan ®). The half shells of wall thickness from ⅛ to ¼ inch were assembled to provide a clamshell mold around a prototype series loop of the stator of a large steam turbine-generator and, with the temporary sprue sub-assembly described above in place, the fill chamber or cavity of the mold with the parts to be insulated disposed substantially centrally or coaxially in the mold was charged with thermosetting resin mixture of the following composition:

| | |
|---|---|
| Epon 828[1] | 33.15 parts |
| DER 732[2] | 17.81 parts |
| Catechol | 1.54 parts |
| Tyzor OG[3] | 1.54 parts |
| Cab-O-Sil-TS 200 | 2.00 parts |
| Minu-Sil 30 microns | 18.97 parts |
| 1/32" glass | 23.25 parts |
| ⅛" glass | 1.70 parts |

[1] Bisphenol-A diglycidyl ether resin
[2] Polyglycol diepoxide (viscosity 1,350 cps at 25° C.)
[3] Tetraoctylene glycol titanate This molding composition was frozen and then preheated in a microwave oven to 100° F. to insure uniform replastication with minimal heat history. Then while flowable as so heated, the composition was injected through the sprue with an air-activated gun to fill the mold cavity around the series loop. After 24 hours at room temperature the assembly was given a post-cure heat treatment at 100° F. for 24 hours. The crack resistance of the composition under accelerated conditions (−70° C. to +130° C.) was good as it passed 10 cycles without any sign of a crack. Further this molding composition was found to have good adhesion to the polycarbonate clamshell and filled well around the intricate design of the loop.

On heating the composite molded insulating body to 150° C., the clamshell mold was easily stripped from the cured mold fill which on heating to 170° C. parted from the metal surfaces.

EXAMPLE II

Another clamshell mold like that of Example I except that the two vacuum-formed half shells were of wall thickness from 1/16 to ⅛ inch were assembled around a prototype series loop of a stator of a large steam turbine-generator. With the sprue sub-assembly in place, as described above, the mold was filled with the thermosetting resin mixture of the following composition:

| | |
|---|---|
| Part A | |
| Epon 826 | 21.06% |
| Araldite 508 | 21.06 |
| Catechol | 7.7 |
| MK 116 | 4.65 |
| Cab-O-Sil-TS200 | 1.75 |
| Min-U-Sil - 30 | 18.42 |
| 1/32" milled glass | 22.36 |
| ⅛" chopped glass | 3.0 |
| Part B | |
| Epon 826 | 22.25% |
| Araldite 508 | 22.25 |
| MK 116 | 4.82 |
| Tyzor O.G. (Tilcom OGT) | 2.88 |
| Cab-O-Sil-TS200 | 2.01 |
| Min-U-Sil 30 | 19.32 |
| 1/32" milled glass fiber | 23.42 |
| ⅛" chopped glass fiber | 3.05 |

The fill composition was prepared by mixing the ingredients of the two parts separately with a double blade planetary mixer and then combining the two parts at time of use. The ultimate mixture for use in filling the mold was produced by bringing Part A and Part B together in equal amounts by weight and mixing until a homogeneous mass resulted. That product was used promptly, being injected through the sprue assembly under pressure of 50 psig. The gel time of the product was about 60 minutes and hardening time of it was from two to three hours. The viscosities at 70° F. of Parts A and B were 440,000 cps and 490,000 cps, respectively, and the viscosity of the homogeneous product at 70° F. was 470,000 cps. Mixing of Parts A and B resulting in the homogeneous product was accomplished through the use of a motionless mixer manufactured and marketed by Liquid Control Corporation, Canton, Ohio.

As in the case of Example I, the mold fill was found to have good adhesion to the polycarbonate clamshell and to have filled completely around the series loop to which it also bonded well, as in the test reported above. Also the crack resistance in this instance matched that of Example I and the dielectric strength of the composite corresponds closely to that recited above.

Again, the test of removability was successfully conducted as the polycarbonate clamshell easily stripped off on heating to about 150° C., and the cured mold fill ported readily from the series loop at 170° C.

Wherever in this specification and in the appended claims, amounts, proportions or percentages are stated, reference is to the weight basis unless otherwise expressly noted.

What is claimed is:

1. In a stator of a large steam turbine generator having a plurality of stator bars and liquid-coolant series loops connected to the stator bars, the combination of a clamshell mold of a first plastic material comprising two half shells having edge portions interfittingly overlapped providing a closed fill chamber and enclosing an end portion of one of said plurality of stator bars, and an end portion of one of said plurality of liquid-coolant series loops connected to said end portion of said one of said plurality of stator bars and having apertures through which said one of said plurality of stator bars and liquid-coolant series loops extend, and cured second plastic material filling the fill chamber and bonded to said connected end portion of said one of said plurality of stator bars and one of said plurality of loops liquid-coolant series within the clamshell mold fill chamber.

2. The combination of claim 1 in which the clamshell mold is of thermoplastic resin and the second plastic material is thermosetting resin.

3. The combination of claim 2 including a ring of sponge elastomeric material secured in each aperture of the clamshell mold non-hermetically sealing said one of said plurality stator bars and series loops to the clamshell mold.

4. The combination of claim 1 in which the two half-shells are substantially the same size and shape but of opposite hand, and in which the clamshell mold is of length substantially the same as that of said one of said plurality of liquid-coolant series loops and the end portion of said one of said plurality of stator bars connected thereto to be insulated by the clamshell mold and said second plastic material filling said clamshell mold.

5. The combination of claim 4 including a plurality of clamshell molds, each of which encloses a separate series loop and stator bar end portion assembly whereby all the stator bars and liquid-coolant series loops of the stator are electrically insulated.

* * * * *